(12) United States Patent
MacDonald

(10) Patent No.: US 7,861,422 B2
(45) Date of Patent: *Jan. 4, 2011

(54) SKYLINE IMAGING SYSTEM FOR SOLAR ACCESS DETERMINATION

(75) Inventor: Willard S. MacDonald, Bolinas, CA (US)

(73) Assignee: Solmetric Corporation, Sebastopol, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/658,456

(22) Filed: Feb. 5, 2010

(65) Prior Publication Data

US 2010/0139105 A1 Jun. 10, 2010

Related U.S. Application Data

(63) Continuation of application No. 11/894,893, filed on Aug. 22, 2007, now Pat. No. 7,690,123.

(51) Int. Cl.
*G01C 17/34* (2006.01)
*G04B 49/02* (2006.01)

(52) U.S. Cl. ............... 33/268; 33/271; 356/139.01

(58) Field of Classification Search ............ 33/1 A, 33/1 C, 1 G, 1 H, 1 SC, 1 CC, 1 DD, 268–273, 33/275 R, 275 G, 300, 301, 331–333; 396/50; 356/139.01; 250/203.1, 203.4, 206.2

See application file for complete search history.

(56) References Cited

U.S. PATENT DOCUMENTS

| 3,769,710 A | 11/1973 | Reister |
| 4,015,116 A | 3/1977 | Bahm |
| 4,156,576 A | 5/1979 | Clavel et al. |
| 4,159,576 A * | 7/1979 | Campbell ............ 33/281 |
| 4,288,922 A | 9/1981 | Lewis |
| 4,302,088 A | 11/1981 | Vezie |
| 6,301,440 B1 | 10/2001 | Bolle et al. |
| 6,338,027 B1 | 1/2002 | Fulton |
| 2005/0230598 A1 | 10/2005 | Hopkins et al. |
| 2007/0150198 A1 | 6/2007 | MacDonald |
| 2007/0214665 A1 | 9/2007 | Courter |

* cited by examiner

*Primary Examiner*—Amy Cohen Johnson
(74) *Attorney, Agent, or Firm*—John L. Imperato

(57) ABSTRACT

A skyline imaging system includes an image sensor and an inclination reference coupled to the image sensor. The inclination reference provides a righting moment for the image sensor and establishes a predetermined orientation for the image sensor relative to the Earth's gravity vector. A heading reference determines an azimuth heading for the image sensor.

20 Claims, 11 Drawing Sheets

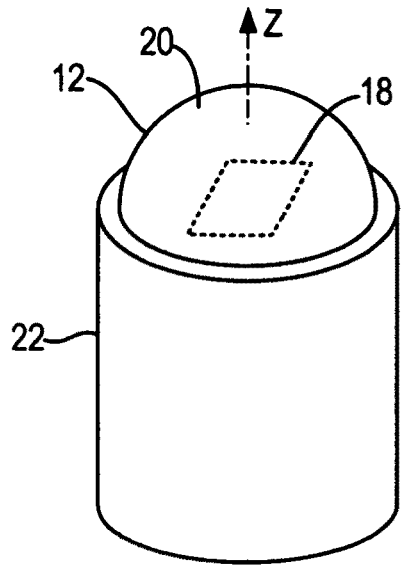
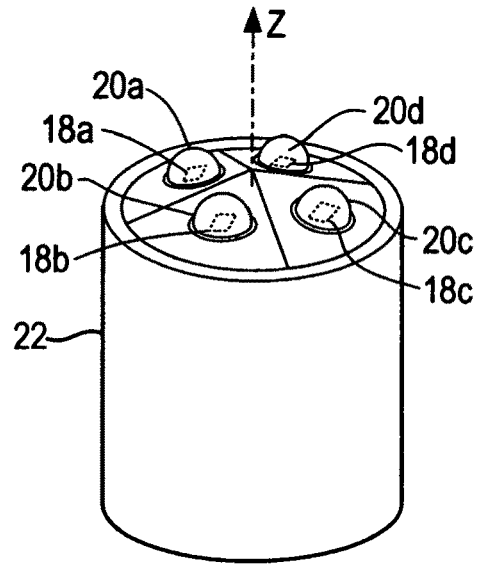
Figure 3A    Figure 3B
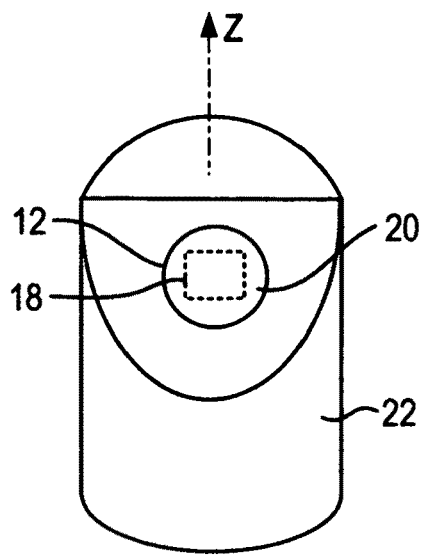
Figure 3C

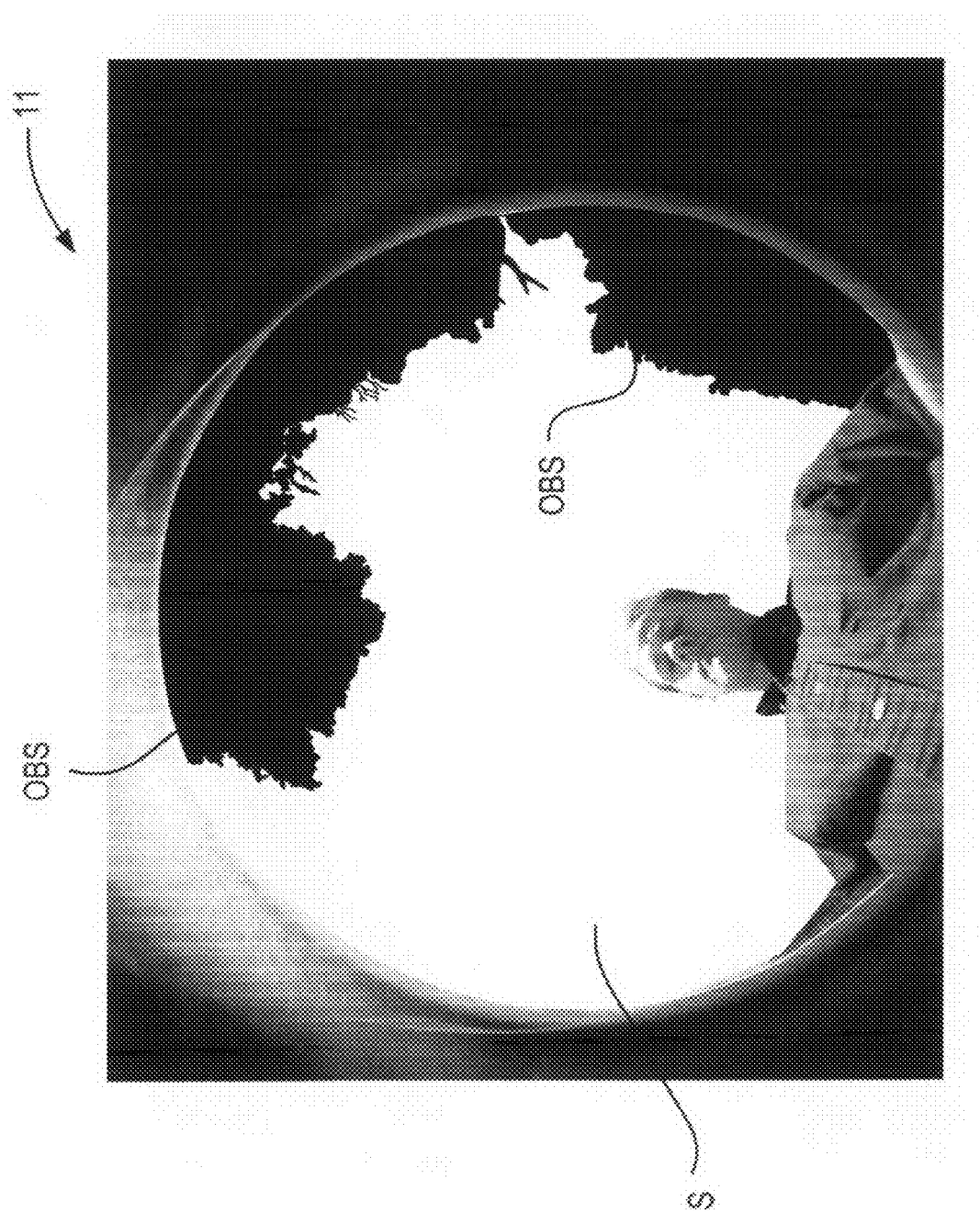

SKYLINE IMAGING SYSTEM FOR SOLAR ACCESS DETERMINATION

CROSS-REFERENCE TO RELATED APPLICATIONS

This application is a continuation of prior application Ser. No. 11/894,893, filed 22 Aug. 2007.

BACKGROUND OF THE INVENTION

Solar access refers to characterization of solar radiation exposure at one or more designated locations. Due to the relative motion between the Sun and the Earth, solar access typically accounts for time-dependent variations in solar radiation exposure that occur on daily and seasonal timescales. The variations in solar radiation exposure are typically attributable to shading variations, atmospheric clearness, or variations in incidence angles of solar radiation at the designated locations where the solar access is determined.

Determining solar access at an installation site of a solar energy system enables installers and designers of the solar energy system to position solar panels within the system to maximize the capture of solar radiation by the solar energy system. Determining solar access at a landscaping site enables landscape designers to select and position plants and other landscape features based on the solar radiation exposure at various locations on the landscaping site. In the fields of architecture, ecological studies, fisheries, forestry, golf course management and in other fields, determining solar access can enable efficient use of solar radiation exposure. Acquiring an orientation-referenced image of the skyline provides a basis for determining solar access at one or more designated locations.

SUMMARY OF THE INVENTION

A skyline imaging system according to embodiments of the present invention includes an image sensor coupled to an orientation reference, enabled to acquire an orientation-referenced image of the skyline. The orientation-referenced image provides a basis for measuring or otherwise determining solar access at one or more designated locations.

BRIEF DESCRIPTION OF THE DRAWINGS

The present invention can be better understood with reference to the following figures. The components in the figures are not necessarily to scale. Emphasis is instead placed upon illustrating the principles and elements of the present invention.

FIGS. 3A-3C show example configurations of image sensors suitable for inclusion in the skyline imaging system according to embodiments of the present invention.

FIG. 6 shows an example of an orientation-referenced image of a skyline acquired by the skyline imaging system according to embodiments of the present invention.

DETAILED DESCRIPTION OF THE INVENTION

Figure 1:
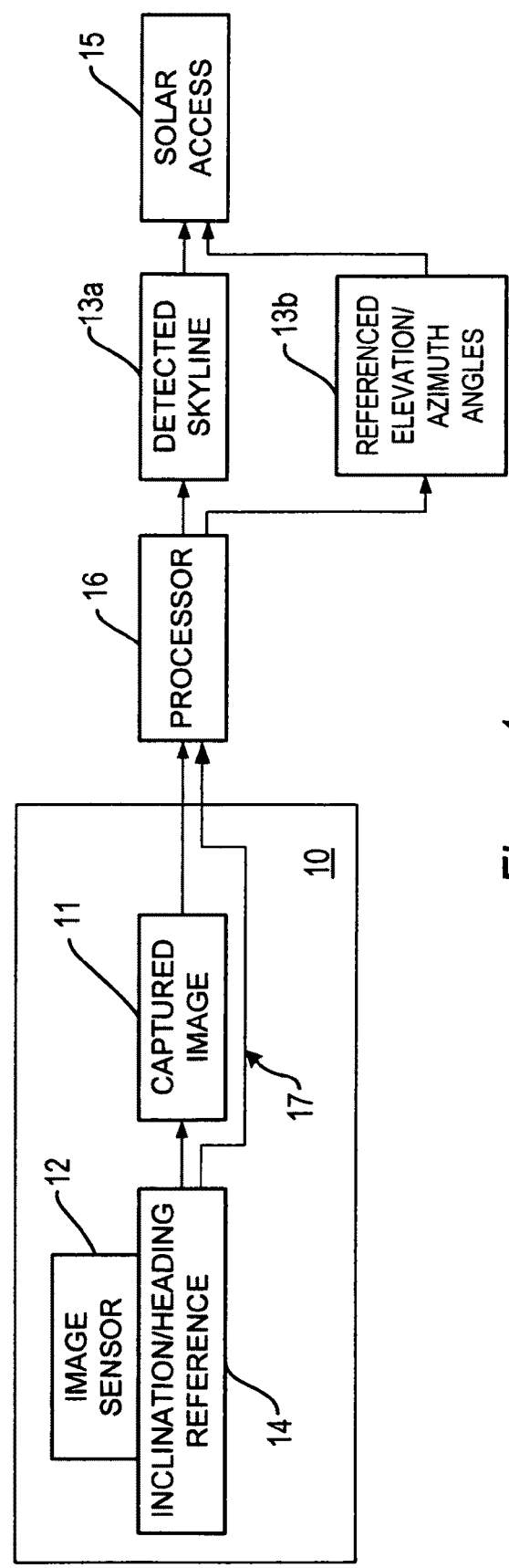
FIG. 1 shows an example of a block diagram of a skyline imaging system according to embodiments of the present invention.

FIG. 1 shows an example of a block diagram of a skyline imaging system 10 according to embodiments of the present invention. The skyline imaging system 10 includes an image sensor 12 and an orientation reference 14 for the image sensor 12, enabled to acquire an orientation-referenced image of a skyline. In FIG. 1, the orientation reference 14 is shown including inclination and heading references.

Figure 7:
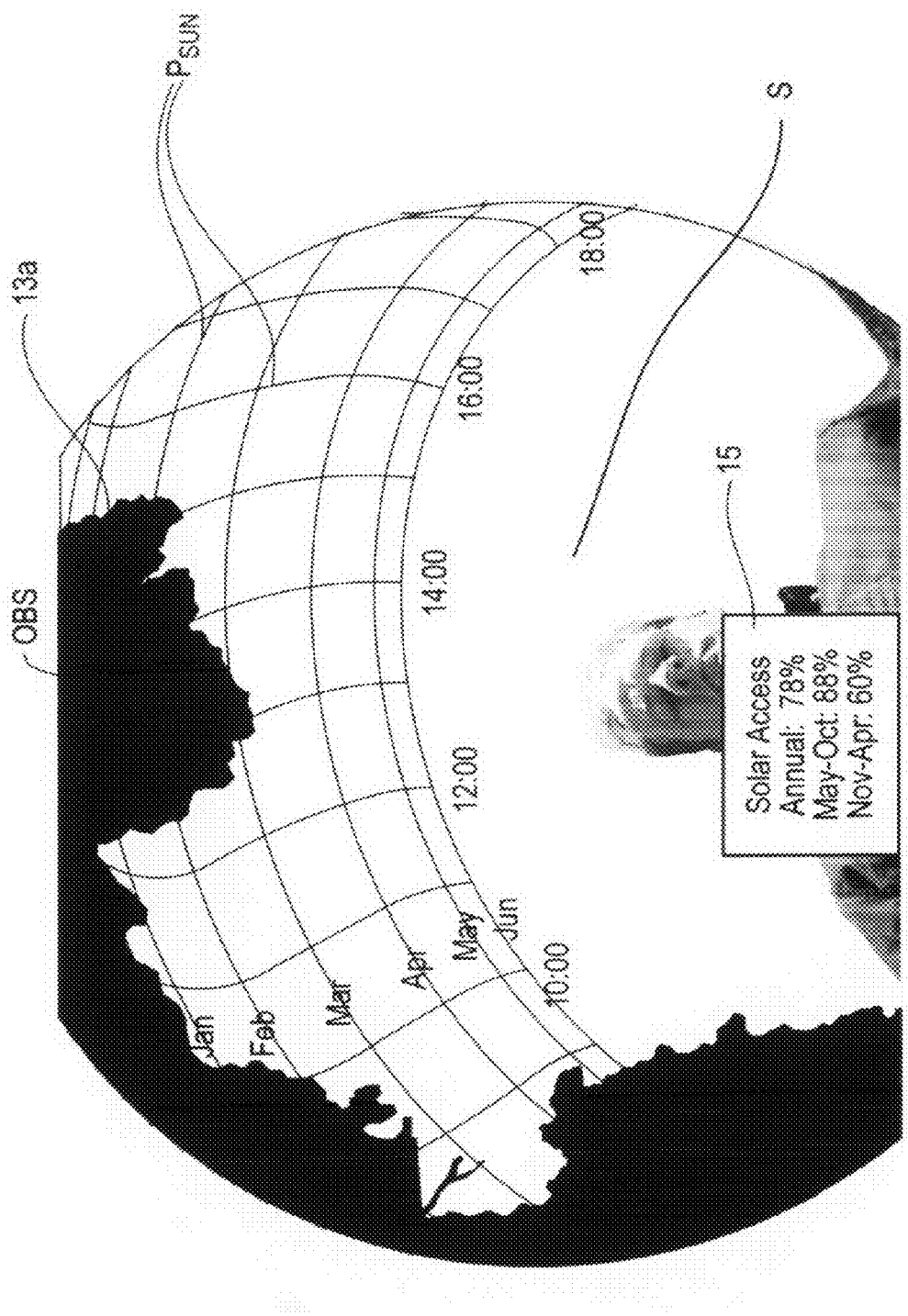
FIG. 7 shows an example of a determination of solar access established based on the orientation-referenced image of the skyline shown in FIG. 6.

In FIG. 1, the skyline imaging system 10 is shown in the context of solar access determination, wherein the skyline imaging system 10 provides the orientation-referenced image of a skyline, alternatively referred to as "captured image 11" (shown in FIG. 6). In this example, the captured image 11 is provided to a processor 16 that computes, detects or otherwise establishes a detected skyline 13a (shown in FIG. 7) and referenced elevation angles and azimuth angles 13b within the captured image 11, suitable for use in the determination of solar access 15. Solar access 15 typically includes characterization of solar radiation exposure at a designated location or orientation, accounting for time-dependent variations in solar radiation exposure from buildings, trees or other obstructions OBS that may cause shading from the Sun due to relative motion between the Sun and Earth. Solar access 15 is typically expressed by available energy provided by the solar radiation exposure, by percentage of energy of solar radiation exposure, by graphical representations of solar radiation exposure versus time, or by other suitable expressions related to, or otherwise associated with, solar radiation exposure. One example of solar access 15 is provided by the SOLMETRIC SUNEYE, shade analysis tool available from SOLMETRIC Corporation of Bolinas, Calif., USA.

One example of the image sensor 12 includes a sensor array 18, a lens 20 (shown in FIG. 2A) and processing circuitry 24, which enable the image sensor 12 to acquire a captured image 11 of a skyline. The captured image 11 has a field of view suitable to include buildings, trees or other obstructions OBS in the skyline. In one example, the image sensor 12 acquires a captured image 11 within a hemispherical field of view disposed about a reference axis z of a mount 22, having a range of 180 degrees in elevation angle, defined for example by 180 degrees of arc about a pivot axis A1 and a pivot axis A2, and a range of 360 degrees in azimuth angle, defined for example by 360 degrees of rotation about the reference axis z. A lens 20 providing for the captured image 11 that is not within a hemispherical field of view is included in alternative examples of the image sensor 12. When the field of view is less than the hemispherical field of view, i.e. a field of view that has fewer than 180 degrees in elevation angle and/or fewer than 360 degrees in azimuth angle, obstructions OBS in the skyline that are not in the field of view are typically absent in the captured image 11, which may result in inaccuracies in the detected skyline 13a provided by the processor 16. The inaccuracies in the detected skyline 13a typically result in corresponding errors in the determination of solar access 15.

An alternative example of the image sensor 12 includes two or more sensor arrays 18a-18d with corresponding lenses 20a-20d on a mount 22, as shown in FIG. 3B. In this example, each of the two or more sensor arrays 18a-18d and corresponding lenses 20a-20d acquire captured images that each have a different orientation and less than a hemispherical field of view. The captured images from each of the individual sensor arrays 18a-18d can be "stitched together" with the captured images of others of the sensor arrays 18a-18d, for example by the processor 16 or processing circuitry 24 (shown in FIG. 2A), to collectively enable the image sensor 12 to acquire a captured image 11 having a hemispherical field of view, or other field of view suitably broad to include buildings, trees or other obstructions OBS within the skyline. The captured images can be stitched together using known image processing techniques, or using any other suitable system for establishing a broader field of view than that of each of the individual sensor arrays 18a-18d and corresponding lenses 20a-20d. In alternative examples of the image sensor 12, two or more sensor arrays 18a-18d and corresponding lenses 20a-20d collectively provide a captured image 11 that is not within a hemispherical field of view. When the field of view is less than the hemispherical field of view, obstructions OBS in the skyline that are not in the field of view are typically absent in the captured image 11, which may result in inaccuracies in the detected skyline 13a provided by the processor 16. The inaccuracies in the detected skyline 13a typically result in corresponding errors in the determination of solar access 15.

In FIGS. 2A-2D and in FIGS. 3A-3B, the image sensor 12 is shown oriented on a mount 22 with the field of view of the image sensor 12 disposed about the reference axis z in a direction parallel to, but opposite in direction to the Earth's gravity vector G. In this orientation, the captured image 11 that is acquired by the image sensor 12 typically incorporates a hemispherical view of the skyline that includes paths $P_{SUN}$ that the Sun traverses on daily and seasonal timescales. When the image sensor 12 has less than a hemispherical view of the skyline, or if the hemispherical view has a predetermined offset from the reference axis z, as shown in FIG. 3C, the captured image 11 acquired by the image sensor 12 typically incorporates an incomplete skyline, wherein one or more portions of the skyline are absent from the captured image 11. While the incomplete skyline may result in inaccuracies in the detected skyline 13a that tend to cause corresponding errors in the determination of solar access 15, the inaccuracies in some examples are typically offset, at least in part, by advantages associated with having the captured image 11 of the skyline and the traversed paths $P_{SUN}$ of the Sun (shown in FIG. 7) more centered in the field of view of the image sensor 12. In the Earth's Northern Hemisphere, the skyline and the traversed paths $P_{SUN}$ of the Sun are more centered in the field of view of the image sensor 12 by an offset to the field of view in elevation from the reference axis z toward the horizon, with an azimuth heading directed toward the South. In the Earth's Southern Hemisphere, the skyline and the traversed paths $P_{SUN}$ of the Sun are more centered in the field of view of the image sensor 12 by an offset to the field of view in elevation from the reference axis z toward the horizon, with an azimuth heading directed toward the North. Advantages associated with having the captured image 11 of the skyline and the traversed paths $P_{SUN}$ of the Sun more centered in the field of view of the image sensor 12 may result from reductions in image compression or other optical distortions that may occur as a result of the skyline and traversed paths $P_{SUN}$ of the Sun being directed to the sensor array 18 by a peripheral, or non-central, portion of the lens 20. For clarity, various elements of the skyline imaging system 10 have been omitted from FIG. 3A-3C.

A digital signal processor ("DSP") or other processing circuitry 24 (shown in FIG. 2A), typically included with or within the image sensor 12, provides for adjustment of one or more of the gain, brightness, and white balance of the sensor array 18 to accommodate a variety of ambient conditions. For example, when the Sun is present in the field of view of the image sensor 12 when the captured image 11 is acquired, the processing circuitry 24 may automatically reduce the gain of the image sensor 12 to prevent saturation of the image sensor 12 by the sunlight. Alternatively, when the Sun is not present in the field of view of the image sensor 12 when the image 11 is captured, the processing circuitry 24 may automatically increase the gain of the image sensor 12 to provide sufficient light sensitivity for the captured image 11. In alternative examples, the image sensor 12 includes or otherwise accommodates any of a variety of hardware or software enhancements or features, or processing that can be associated with cameras or other types of image acquisition devices, elements, or systems. The captured images 11 acquired by the image sensor 12 are typically stored in a buffer or other suitable memory (not shown) that is included with the image sensor 12, the processing circuitry 24, or the processor 16, or that is otherwise associated with the skyline imaging system 10.

In alternative examples of the image sensor 12, an infrared filter or other type of filter (not shown) is interposed between each of the one or more lenses and sensor arrays of the image sensor 12. Alternatively, the filter is integrated into the one or more lenses of the image sensor 12, or the filter is otherwise positioned in the field of view of the image sensor 12 to reduce the amount of light or modify the frequency content of the light that is incident on the sensor array 18 within the image sensor 12.

The lens 20 included in the image sensor 12 typically includes one or more optical elements that establish the field of view or other optical characteristics for the image sensor 12. In one example, the lens 20 is implemented with a fisheye lens that includes six optical elements to establish a hemispherical field of view. In another example, the image sensor 12 includes a hemispherical convex reflector, a hemispherical concaved reflector, or any other contoured reflective surface that reflects, projects, or otherwise presents an image of the relevant skyline to the sensor array 18, typically through a lens 20 interposed between the contoured reflective surface and the sensor array 18. In alternative examples, the lens 20 includes an optical waveguide or light pipe, one or more reflectors, or any other optical devices, elements or systems suitable for projecting or otherwise presenting images of the relevant skyline to the sensor array 18. The hemispherical field of view of the image sensor 12 typically encompasses a semi-sphere, dome or any other shaped or contoured field of view that is suitable for acquiring orientation-referenced images of the skyline. The sensor array 18 is typically a CCD or CMOS device, or other device, element, or system suitable for capturing a digital image.

FIGS. 2A-2D show example implementations of the skyline imaging system 10 according to alternative embodiments of the present invention. In each of these example implementations, the skyline imaging system 10 includes an orientation reference 14 having an inclination reference 14a that aligns the reference axis z of the mount 22 for the image sensor 12 parallel to the Earth's gravity vector G. This alignment of the reference axis z provides a level reference for the captured images 11 that are acquired by the image sensor 12, independent of the inclination of the housing H, or of the device, element or system within which the skyline imaging system 10 is included. In the example implementations of the skyline imaging system 10 shown in FIGS. 5A-5B, the orientation reference 14 includes an inclination reference 14a and a heading reference 14b. While the orientation reference 14 in one or more example implementation is typically positioned within a recess in a housing H (shown in FIGS. 4A-4C), the housing H is omitted from FIGS. 2A and 5A-5B for clarity.

Figure 2A:
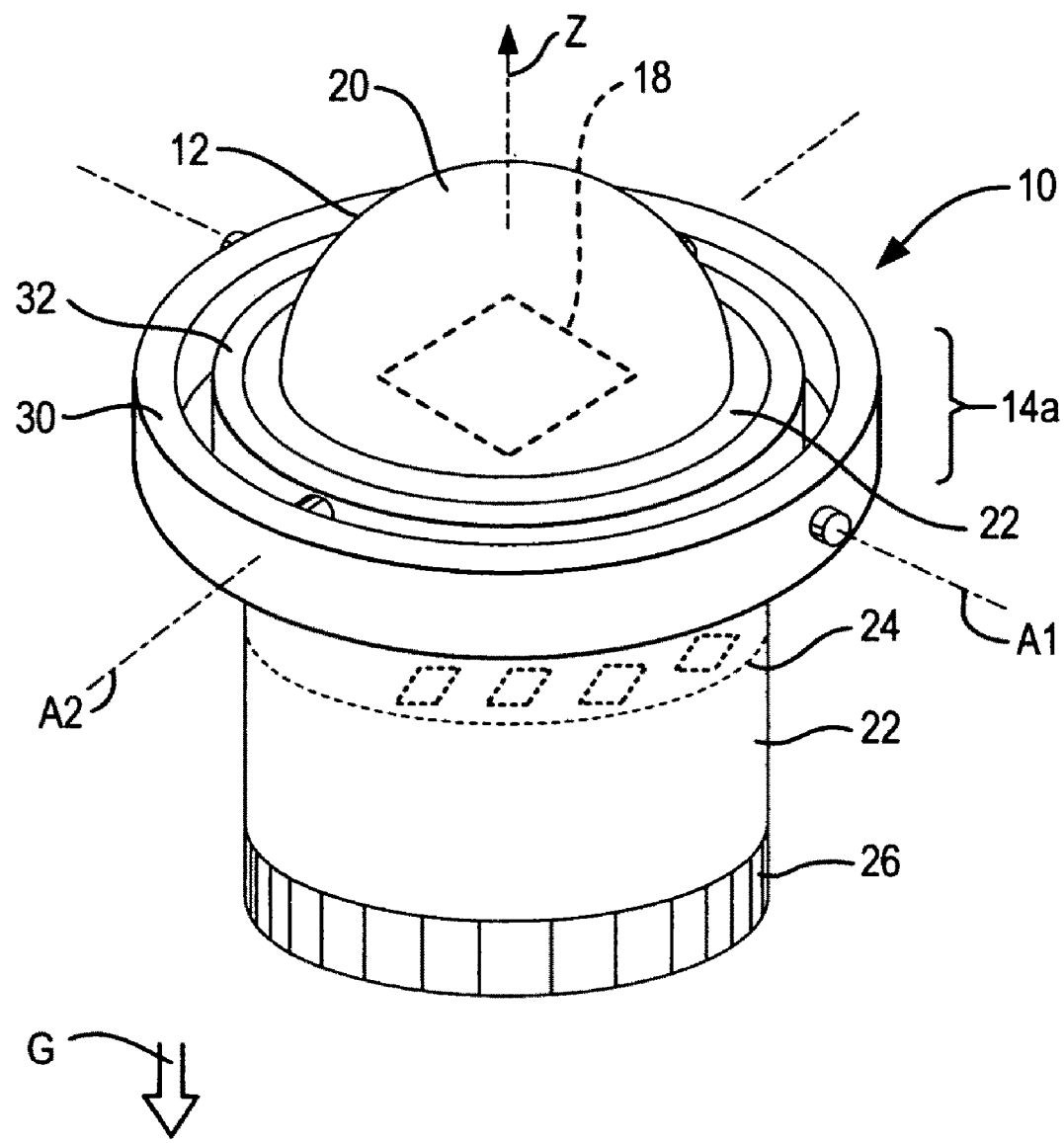
FIGS. 2A-2D show examples of the skyline imaging system according to embodiments of the present invention.

In the example shown in FIG. 2A, the inclination reference 14a includes the mount 22 for the image sensor 12 coupled to a two-dimensional gimbal that includes an outer gimbal ring 30 pivotally mounted on a pivot axis A1 and having an inner gimbal ring 32 pivotally mounted on a pivot axis A2 that is orthogonal to the pivot axis A1. In this example, the mount 22 is secured within the inner gimbal ring 32.

The inclination reference 14a also includes a ballast 26 positioned on the mount 22 below the pivot axis A1 and the pivot axis A2. The ballast 26 is sufficiently large and the ballast 26 is positioned sufficiently below the pivot axis A1 and the pivot axis A2 to provide a righting moment for the image sensor 12 and the mount 22. The righting moment aligns the reference axis z of the mount 22 parallel to the Earth's gravity vector G. The ballast 26 typically includes any suitable form of mass and/or one or more circuit boards, such as the processing circuitry 24 typically associated with the image sensor 12, to establish the righting moment. The righting moment is typically a force resulting from the Earth's gravity vector G acting on the ballast 26 that provides a bias that pivots the mount 22 about the pivot axes A1, A2 to align the reference axis z of the mount 22 with the Earth's gravity vector G.

Pivotal mounting of the inner gimbal ring 32 and outer gimbal ring 30 is achieved in a variety of ways that are each suitable to enable the righting moment to align the reference axis z of the mount 22 parallel to the Earth's gravity vector G. In one example, shown in a top view of the inclination reference 14a in FIG. 4A, the pivotal mounting of the outer gimbal ring 30 is achieved using bearings B1, B2 positioned in the housing H associated with the skyline detection system 10. The bearings B1, B2 have corresponding shafts S1, S2 protruding from inner races of the bearings B1, B2 to the outer gimbal ring 30, enabling the outer gimbal ring 30 to pivot about the pivot axis A1 in a gap g1 between the housing H and the outer gimbal ring 30. Alternatively, the outer gimbal ring 30 includes the bearings B1, B2, and corresponding shafts S1, S2 protrude from inner races of the bearings B1, B2 to the housing H to enable the pivotal mounting of the outer gimbal ring 30 about the pivot axis A1. The pivotal mounting of the inner gimbal ring 32 is achieved using bearings B3, B4 positioned in the outer gimbal 30. The bearings B3, B4 have corresponding shafts S3, S4 protruding from inner races of bearings B3, B4 to the inner gimbal ring 32, enabling the inner gimbal ring 32 to pivot about the axis A2 in a gap g2 between the inner gimbal ring 32 and the outer gimbal ring 30. Alternatively, the inner gimbal ring 32 includes the bearings B3, B4, and corresponding shafts S3, S4 protrude from inner races of the bearings B3, B4 to the outer gimbal ring 30 to enable the pivotal mounting of the inner gimbal ring 32 about the pivot axis A2.

Figure 4A:
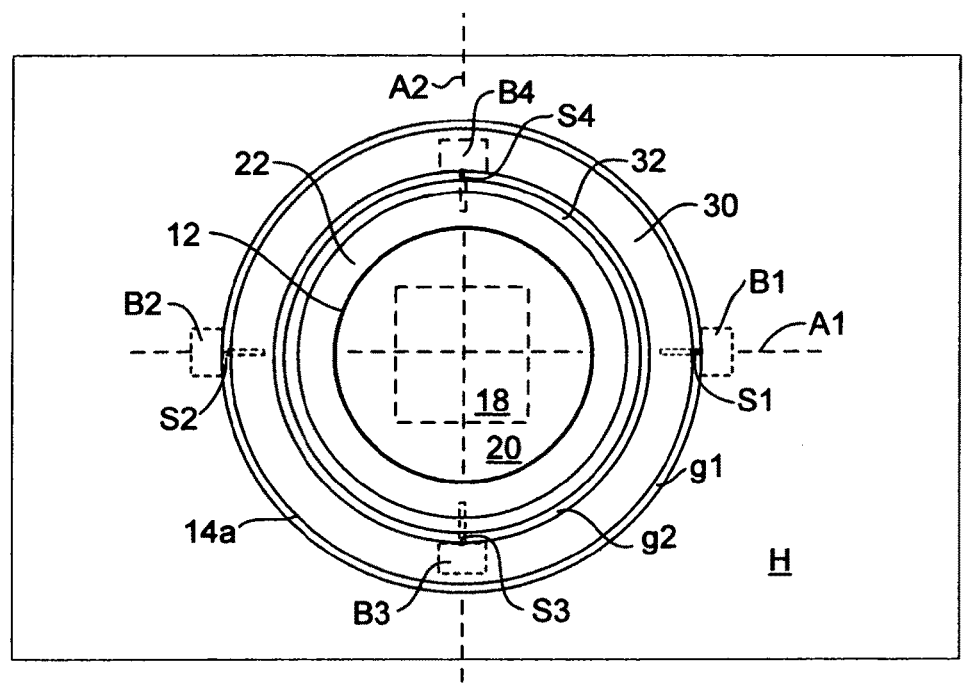
FIGS. 4A-4C show top views of examples of inclination references included in the skyline imaging system according to embodiments of the present invention.
Figure 4B:
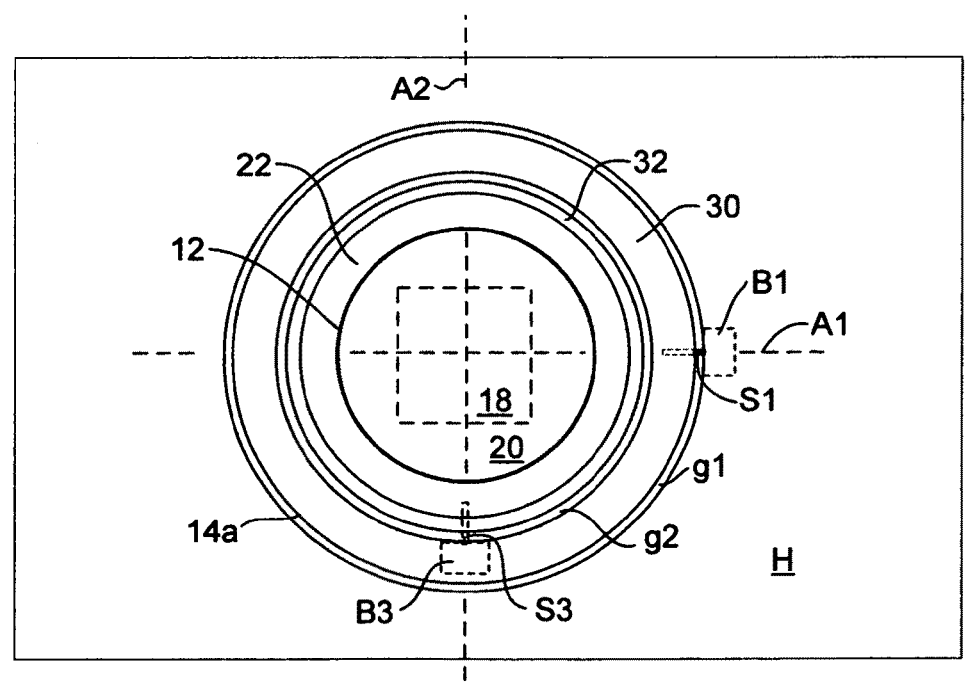

FIG. 4B shows pivotal mounting of the outer gimbal ring 30 about the pivot axis A1 within the housing H established by a single one of the bearings B1 and a single corresponding one of the shafts S1 positioned in the housing H or the outer gimbal ring 30. In this example, pivotal mounting of the inner gimbal ring 32 about the pivot axis A2 within the outer gimbal ring 30 is established by a single one of the bearings B3 and a single corresponding one of the shafts S3 positioned in either the inner gimbal ring 32 or the outer gimbal ring 30.

Figure 4C:
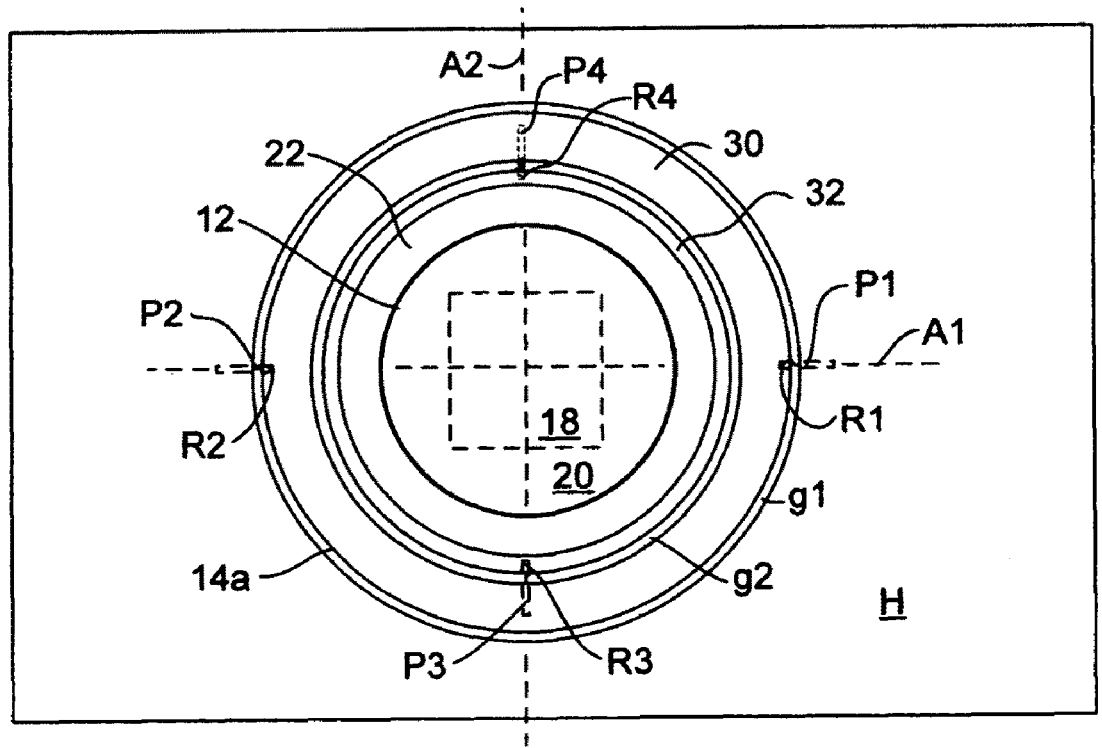

In an alternative example shown in a top view of the inclination reference 14a in FIG. 4C, the pivotal mounting of the outer gimbal ring 30 about the pivot axis A1 is achieved with a pair of coaxial pins P1, P2 that extend from the housing H and into a corresponding pair of pivot receptors R1, R2 in diametrically-opposed positions on an outer surface of the outer gimbal ring 30. Here, the pair of coaxial pins P1, P2 extending from the housing H, and corresponding pivot receptors R1, R2 on the outer surface of the outer gimbal ring 30 are aligned with the pivot axis A1. This enables the outer gimbal ring 30 to pivot about the pivot axis A1 in a gap g1 between the housing H and the outer gimbal ring 30. Alternatively, the pair of coaxial pins P1, P2 extend from the outer surface of the outer gimbal ring 30 and the corresponding pivot receptors R1, R2 are within the housing H, aligned with the pivot axis A1. In the example shown in FIG. 4C, the pivotal mounting of the inner gimbal ring 32 is achieved with a pair of coaxial pins P3, P4 that extend from an inner surface of the outer gimbal ring 30 and into a corresponding pair of pivot receptors R3, R4 in diametrically-opposed positions on an outer surface of the inner gimbal ring 32. Here, the pair of coaxial pins P3, P4 and the corresponding pivot receptors R3, R4 are aligned with the pivot axis A2. This enables the inner gimbal ring 32 to pivot about the pivot axis A2 in a gap g2 between the outer gimbal ring 30 and the inner gimbal ring 32. Alternatively, the pair of coaxial pins P3, P4 extend from an outer surface of the inner gimbal ring 32, and the corresponding pair of pivot receptors R3, R4 are within an inner surface of the outer gimbal ring 30, aligned with the pivot axis A2. In each example, the coaxial pins have circular, triangular, or other suitable cross-sectional shapes to enable pivotal mounting of the outer gimbal ring 30 about the pivot axis A1 and pivotal mounting of the inner gimbal ring 32 about the pivot axis A2.

According to alternative embodiments of the skyline imaging system 10, dampening for the pivotal mounting of the mount 22 is included into the two-dimensional gimbal included in the inclination reference 14a using friction washers, grease, magnetic forces or any devices, elements or systems suitable for damping pivotal motion about the pivot axes A1, A2 caused for example by the righting moment or motion of the housing H or of the device, element, or system within which the skyline imaging system 10 is included.

Figure 2B:
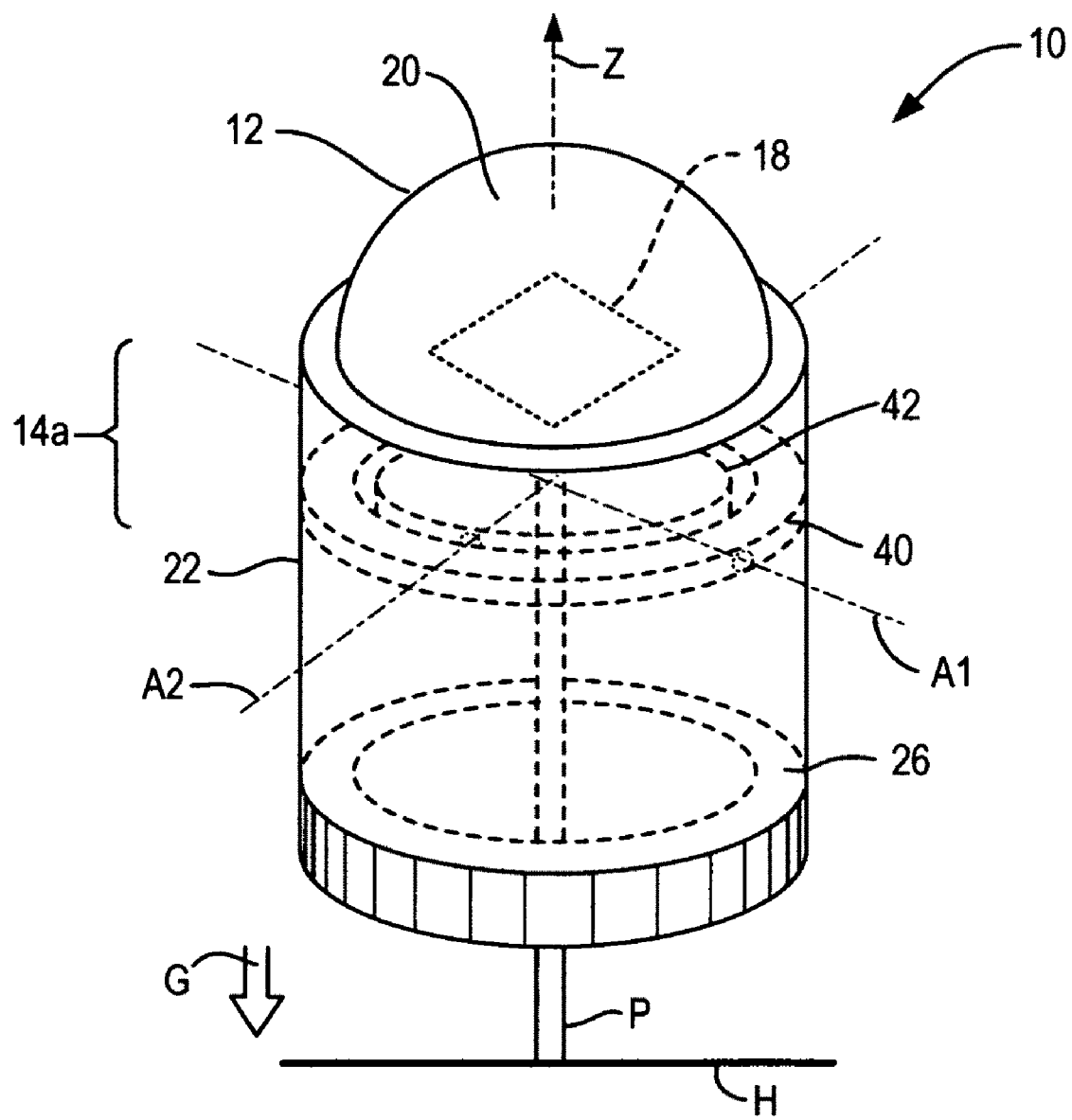

In the example shown in FIG. 2B, the inclination reference 14a includes the mount 22 for the image sensor 12 coupled to a two-dimensional gimbal that includes an outer gimbal ring 40 pivotally mounted on a pivot axis A1 and an inner gimbal ring 42 pivotally mounted on a pivot axis A2 that is orthogonal to the pivot axis A1. In this example, the outer gimbal ring 40 is pivotally mounted to an inner wall surface of the mount 22, and the inner gimbal ring 42 is coupled to the housing H by a support post P. The inclination reference 14a also includes a ballast 26 positioned on the mount 22 below the pivot axis A1 and the pivot axis A2. The ballast 26 is sufficiently large and the ballast 26 is positioned sufficiently below the pivot axis A1 and the pivot axis A2 to establish a righting moment that aligns the reference axis z of the mount 22 parallel to the Earth's gravity vector G. The ballast 26 typically includes any suitable form of mass and/or one or more circuit boards, such as the processing circuitry 24 (not shown) typically associated with the image sensor 12, to establish the righting moment. The righting moment is typically a force resulting from the Earth's gravity vector G acting on the ballast 26 that provides a bias that pivots the mount 22 about the pivot axes A1, A2 to align the reference axis z of the mount 22 with the Earth's gravity vector G.

Pivotal mounting of the outer gimbal ring 40 and the inner gimbal ring 42 is achieved with bearings and corresponding shafts, or with coaxial pins and corresponding pivot receptors, as is shown in the examples of FIGS. 4A-4C. Alternatively, the pivotal mounting is achieved with any devices, elements or systems that enable the righting moment provided by the ballast 26 to establish alignment of the reference axis z of the mount 22 parallel to the Earth's gravity vector G.

Figure 2C:
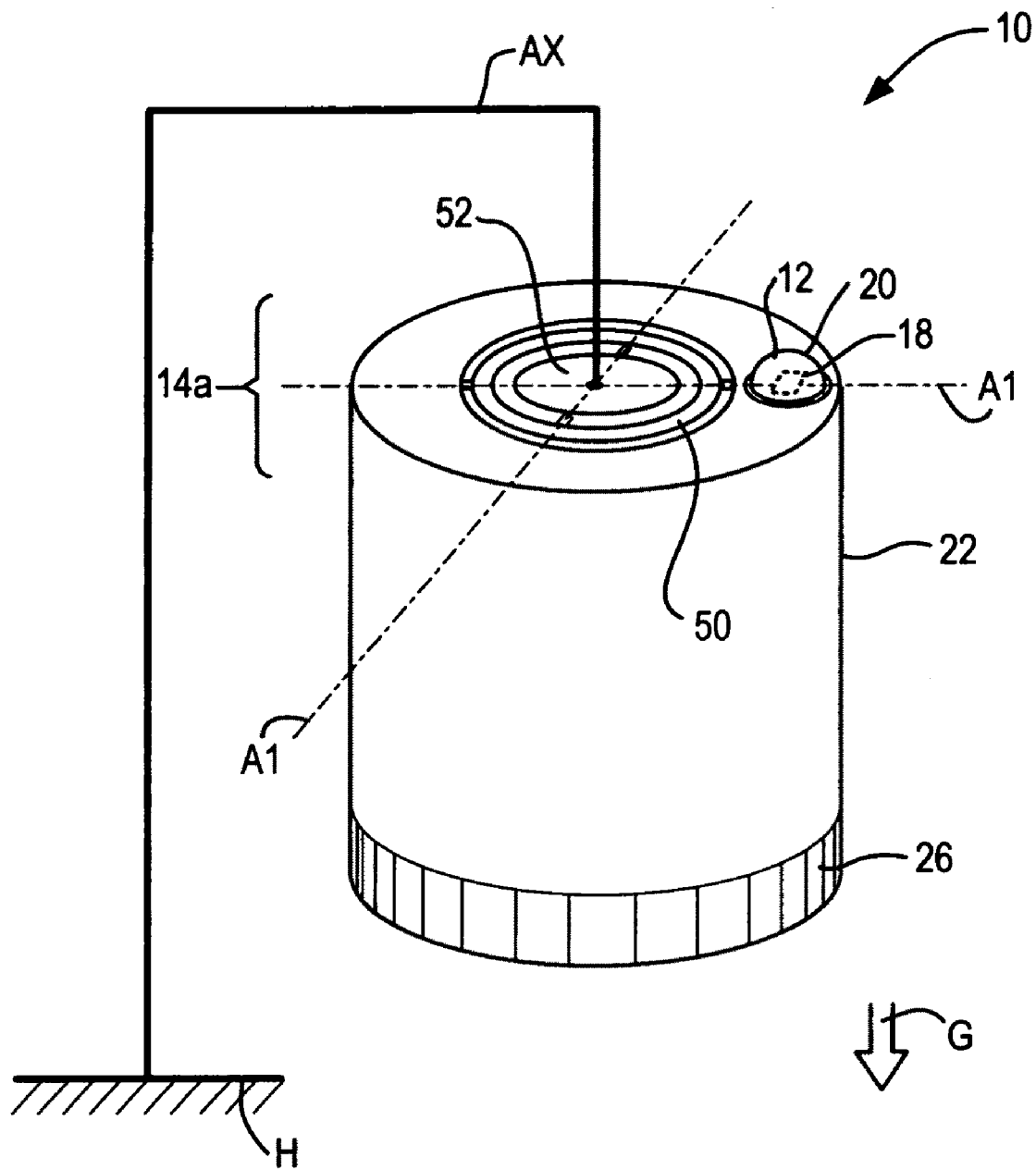

In the example shown in FIG. 2C, the inclination reference 14a includes the mount 22 for the image sensor 12 coupled to a two-dimensional gimbal that includes an outer gimbal ring 50 pivotally mounted on a pivot axis A1 and an inner gimbal ring 52 pivotally mounted on a pivot axis A2 that is orthogonal to the pivot axis A1. In this example, the inner gimbal ring 52 is coupled to the housing H by a support arm AX and the outer gimbal ring 50 is pivotally mounted to the mount 22. The inclination reference 14a also includes a ballast 26 positioned on the mount 22 below the pivot axis A1 and the pivot axis A2. The ballast 26 is sufficiently large and the ballast 26 is positioned sufficiently below the pivot axis A1 and the pivot axis A2 to establish a righting moment that aligns the reference axis z of the mount 22 parallel to the Earth's gravity vector G. The ballast 26 typically includes any suitable form of mass and/or one or more circuit boards, such as the processing circuitry 24 (not shown) typically associated with the image sensor 12, to establish the righting moment.

Pivotal mounting of the outer gimbal ring 50 and the inner gimbal ring 52 is achieved with bearings and corresponding shafts, or with coaxial pins and corresponding pivot receptors, as shown in the examples of FIGS. 4A-4C, or according to any means suitable to enable the righting moment provided by the ballast 26 to align the reference axis z of the mount 22 parallel to the Earth's gravity vector G.

Figure 2D:
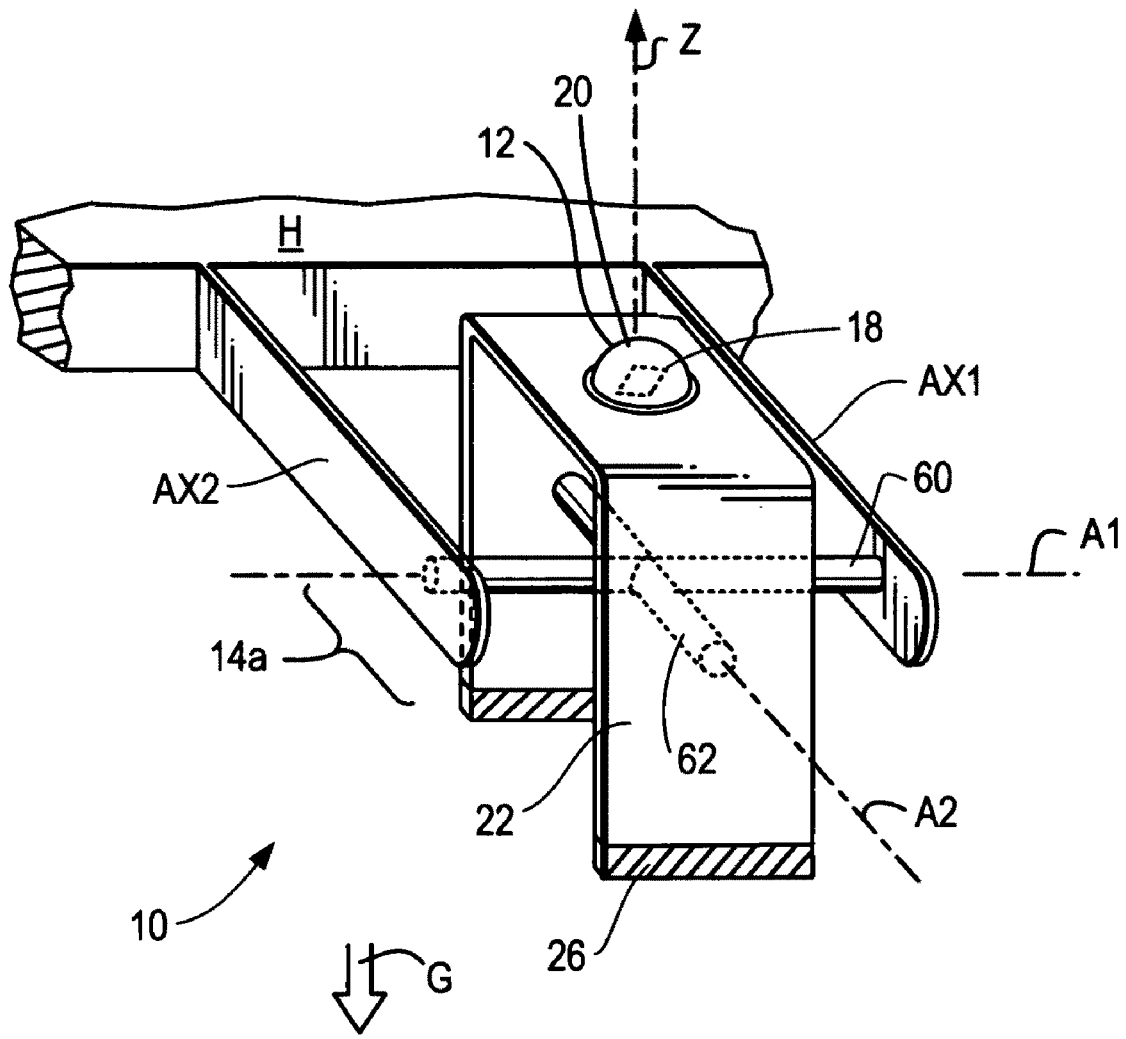

In the example shown in FIG. 2D, the inclination reference 14a includes the mount 22 for the image sensor 12 coupled to a two-dimensional gimbal that includes an outer gimbal shaft 60 pivotally mounted on a pivot axis A1. In this example, an inner gimbal shaft 62 is connected to the outer gimbal shaft 60 in a fixed arrangement, and the outer gimbal shaft 60 is pivotally mounted to a pair of support arms AX1, AX2 that extend from the housing H. The mount 22 is pivotally mounted to the inner gimbal shaft 62 on a pivot axis A2 that is orthogonal to the pivot axis A1. The inclination reference 14a also includes a ballast 26 positioned on the mount 22 below the pivot axis A1 and the pivot axis A2 to establish a righting moment that aligns the reference axis z of the mount 22 below the pivot axis A1 and the pivot axis A2. The ballast 26 is sufficiently large and the ballast 26 is positioned sufficiently below the pivot axis A1 and the pivot axis A2 to establish a righting moment that aligns the reference axis z of the mount 22 parallel to the Earth's gravity vector G. The ballast 26 typically includes any suitable form of mass and/or one or more circuit boards, such as the processing circuitry 24 (not shown) typically associated with the image sensor 12, to establish the righting moment. In alternative examples of the skyline imaging system 10 shown in FIG. 2D, one or both of the outer gimbal shaft 60 and the inner gimbal shaft 62 have a single end, rather than both ends, that provides for pivotal mounting on corresponding pivot axes A1, A2.

Pivotal mounting of the outer gimbal shaft 60 and the mount 22 to the inner gimbal shaft 62 is achieved with bearings and corresponding shafts, or with coaxial pins and corresponding pivot receptors, as shown in the examples of FIGS. 4A-4C or according to any means suitable to enable the righting moment provided by the ballast 26 to align the reference axis z of the mount 22 parallel to the Earth's gravity vector G.

While several examples of pivotal mounting of the outer gimbal ring 30, 40, 50 and outer gimbal shaft 60, and the inner gimbal ring 32, 42, 52 and inner gimbal shaft 62 relative to the housing H have been shown, pivotal mounting about corresponding pivot axes A1, A2, respectively, is achieved in any of a variety of ways, using any devices, elements or systems that enable the righting moment provided by the ballast 26 to establish alignment of the reference axis z of the mount 22 parallel to the Earth's gravity vector G. The inner gimbal rings and outer gimbal rings in each example of the inclination reference 14a are shown to be circular. In other examples of the inclination reference 14a, the inner gimbal rings and outer gimbal rings are rectangular, square, or of any other suitable shape that enables pivotal mounting of the mount 22 for the image sensor 12. In alternative examples, the inclination reference 14a includes a single gimbal ring or single gimbal shaft that provides a one-dimensional gimble for pivotal mounting of the mount 22 about a single pivot axis. In these examples, the mount 22 is coupled to the one dimensional gimbal, which enables the righting moment to align the reference axis z with the Earth's gravity vector G in a single dimension.

In FIGS. 4A-4C, the pivot axes A1, A2 are shown in an orthogonal arrangement, wherein the axis A1 is at a right angle to the axis A2. According to embodiments of the present invention, the axes A1, A2 have any arrangement or orientation that enables the righting moment to align the reference axis z of the mount 22 parallel to the Earth's gravity vector G. The reference axis z of the mount 22 is typically a central axis or any other suitable axis of alignment for the mount 22 that the righting moment aligns parallel to the Earth's gravity vector G. Alignment of the reference axis z parallel to the Earth's gravity vector G typically disposes the field of view of the image sensor 12 about the reference axis z in a direction that is opposite to the direction of the Earth's gravity vector.

Figure 5A:
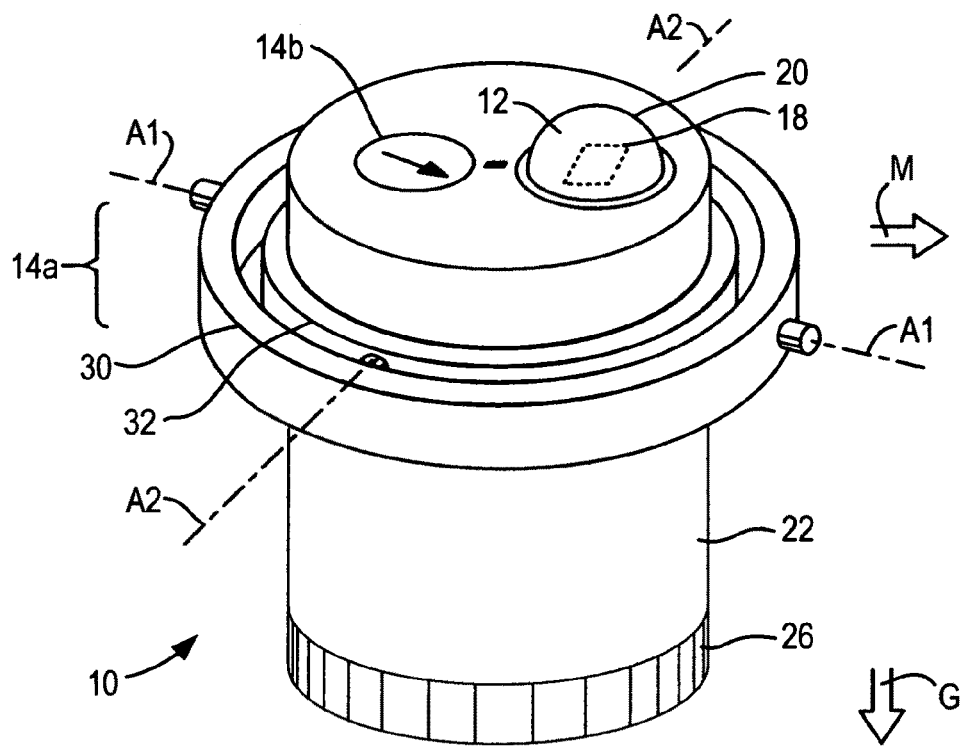
FIGS. 5A-5B show examples of the skyline imaging system, including an inclination reference and a heading reference, according to embodiments of the present invention.
Figure 5B:
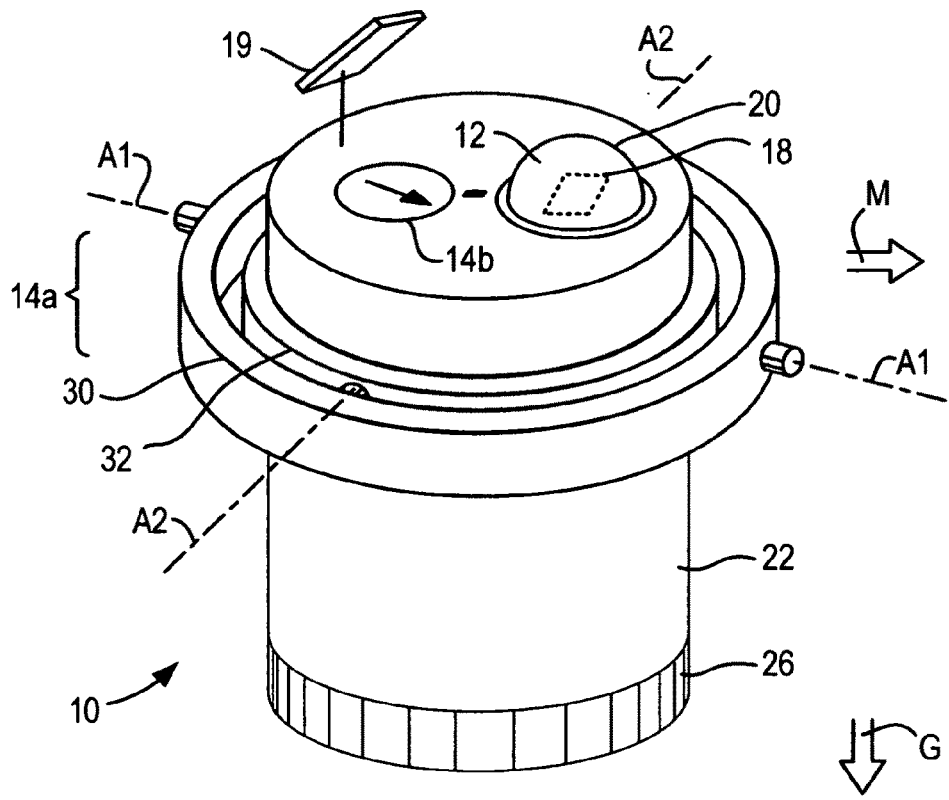

According to embodiments of the skyline imaging system 10 shown in FIGS. 5A-5B, the orientation reference 14 includes a heading reference 14b integrated with the inclination reference 14a. The heading reference 14b is positioned on the mount 22 at a predesignated or an otherwise known azimuth orientation to the image sensor 12. Integrating the heading reference 14b with the inclination reference 14a enables the heading reference 14b to operate in a level orientation, orthogonal to the Earth's gravity vector G. Operating the heading reference 14b in the level orientation enables the heading reference 14b to be implemented with a conventional analog compass or electronic compass to establish referenced azimuth angles for the captured images 11 that are acquired by the image sensor 12. In the example where the heading reference 14b is implemented using an electronic compass, the electronic compass establishes an azimuth reference for the captured images 11 based on an electronic or other suitable reading provided as an output signal 17 (shown in FIG. 1) to the processor 16 or other device, element or system within which the skyline imaging system 10 is included.

In alternative examples of the orientation reference 14, the azimuth heading is designated manually by a user of the device, element or system within which the skyline imaging system 10 is included. In one example, the user can read the heading reference 14b and adjust the azimuth heading of the image sensor 12 to a magnetic south, magnetic north or other designated azimuth heading based on the reading. As a result, the captured images 11 have a level reference established by the inclination reference 14a and an azimuth reference established by the user-adjusted azimuth heading. Typically, the heading reference 14b included within the skyline imaging system 10 determines an azimuth heading for the image sensor 12 relative to the Earth's magnetic vector M.

In the example shown in FIG. 5B, the heading reference 14b is positioned within the field of view of the image sensor 12, enabling the azimuth reference to be established visually for the captured images 11 that are acquired by the image sensor 12. In one example, a mirror or other type of reflector 19 projects an image of the heading reference 14b in the field of view of the image sensor 12. The captured image 11 acquired by the image sensor 12 then includes the projected image of the heading reference 14b. Typically, this captured image 11 is provided to the processor 16, which establishes the azimuth reference for the captured image 11 based on the projected image of the heading reference 14b.

In another example, the heading reference 14b is not integrated with the inclination reference 14a. Here the heading reference 14b includes a compass, or other device, element or system suitable for establishing an azimuth heading, and a user of the skyline imaging system 10 orients the skyline imaging system 10 manually or by any other suitable means to establish the azimuth reference for the captured image 11. According to alternative embodiments of the present invention wherein the heading reference 14b is not integrated with the inclination reference 14a on the mount 22 to operate in the level orientation, the heading reference 14b typically includes accommodation or compensation for the Earth's gravity vector G to establish an accurate designation of azimuth heading.

The skyline imaging system 10 provides an orientation-referenced image of the skyline 11, or captured image 11, that is associated with the skyline imaging system 10. FIG. 6 shows one example of an orientation-referenced image of the skyline 11 that typically includes unobstructed sky S and earth-bound objects such as buildings, trees or other obstructions OBS within the skyline that may cause shading from the Sun due to relative motion between the Sun and Earth.

The inclination reference 14a provides a level reference for the captured image 11 and the heading reference 14b provides an azimuth reference within the field of view of the captured image 11. The inclination reference 14a and the heading reference 14b enable the processor 16 to establish referenced elevation angles and referenced azimuth angles 13b within the captured image 11. Typically, the processor 16 establishes the referenced elevation angles and referenced azimuth angles 13b by mapping pixels within the captured image 11 to corresponding pairs of referenced elevation angles and referenced azimuth angles. In one example, the pixels within the captured image 11 are mapped by establishing the position of the level reference within the captured image 11 provided by the inclination reference 14a, and by establishing the position of the azimuth reference within the captured image 11 provided by the heading reference 14b. These established references are typically combined with a calibration image taken by the image sensor 12 that provides additional predesignated elevation and azimuth angles, and/or combined with mathematical interpolation or curve fitting between known elevation and azimuth angles, with a look-up table, or with other types of correspondence between pixels in the captured image 11 and pairs of elevation angles and azimuth angles. The processor 16 or other device, element or system with which the skyline imaging system 10 is associated, integrated, or included is suitable to provide a detected skyline 13a (shown in FIG. 7) from the captured image 11, and based on the referenced elevation angles and referenced azimuth angles 13b, is suitable to overlay paths $P_{SUN}$ that the Sun traverses on daily and seasonal timescales to determine the solar access 15. The detected skyline 13a includes the boundary between open unobstructed sky and earth-bound objects such as buildings, trees and other obstructions OBS within the orientation referenced image of the skyline 11 that may cause shading from the Sun on daily and seasonal timescales. The boundary in the detected skyline 13a typically includes the pixels, having corresponding pairs of referenced elevation angles and referenced azimuth angles 13b, that occur at the interface between the open unobstructed sky and the earth-bound objects such as buildings, trees and other obstructions OBS. Examples of detected skylines 13a, overlayed paths $P_{SUN}$ that the Sun traverses on daily and seasonal timescales, and solar access 15 are provided by the SOLMETRIC SUN-EYE shade analysis tool, available from SOLMETRIC Corporation of Bolinas, Calif., USA.

While the embodiments of the present invention have been illustrated in detail, it should be apparent that modifications and adaptations to these embodiments may occur to one skilled in the art without departing from the scope of the present invention as set forth in the following claims.

The invention claimed is:

1. A skyline imaging system, comprising:
an image sensor;
a heading reference determining an azimuth heading for the image sensor; and
an inclination reference coupled to the image sensor providing for pivotal mounting of the image sensor about at least one pivot axis within a housing, wherein the image sensor acquires an orientation-referenced image of a skyline within a field of view that is offset from the Earth's gravity vector.

2. The skyline imaging system of claim 1 wherein providing the field of view that is offset from the Earth's gravity vector increases centering of one or more paths that the Sun traverses on at least one of a daily and a seasonal timescale within the field of view of the image sensor, relative to a field of view that is aligned with the Earth's gravity vector.

3. The skyline imaging system of claim 1 wherein the inclination reference includes a one-dimensional gimbal having a single pivot axis.

4. The skyline imaging system of claim 1 wherein the inclination reference includes a two-dimensional gimbal having two pivot axes.

5. The skyline imaging system of claim 1 wherein the orientation-referenced image of the skyline is provided to a processor enabled to establish referenced elevation angles and referenced azimuth angles within the orientation-referenced image of the skyline.

6. The skyline imaging system of claim 5 wherein the processor maps pixels within the orientation-referenced image of the skyline to corresponding pairs of referenced elevation angles and referenced azimuth angles for the orientation-referenced image of the skyline.

7. The skyline imaging system of claim 6 wherein the processor establishes a detected skyline within the orientation-referenced image of the skyline.

8. The skyline imaging system of claim 5 wherein the processor overlays within the orientation-referenced image of the skyline, one or more paths that the Sun traverses on at least one of a daily and a seasonal timescale.

9. The skyline imaging system of claim 8 wherein the processor determines solar access based on a detected skyline established from the orientation-referenced image of the skyline and the one or more paths that the Sun traverses on at least one of a daily and a seasonal timescale.

10. The skyline imaging system of claim 1 further comprising a processor enabled to establish a detected skyline from the orientation-referenced image of the skyline.

11. The skyline imaging system of claim 10 wherein the processor determines solar access based on the detected skyline and established referenced elevation angles and referenced azimuth angles within the orientation-referenced image of the skyline.

12. A skyline imaging system, comprising:

an image sensor coupled to an orientation reference having an inclination reference providing pivotal mounting for the image sensor about at least one pivot axis, wherein the image sensor acquires an orientation-referenced image of a skyline that has a field of view that is offset from the Earth's gravity vector;

a heading reference that determines an azimuth heading for the image sensor; and a processor that receives the orientation-referenced image of the skyline provided by the image sensor.

13. The skyline imaging system of claim 12 wherein the field of view that is offset from the Earth's gravity vector increases centering of one or more paths that the Sun traverses on at least one of a daily and a seasonal timescale within the orientation-referenced image of the skyline, relative to a field of view that is aligned with the Earth's gravity vector.

14. The skyline imaging system of claim 13 wherein the processor maps pixels within the orientation-referenced image of the skyline to corresponding pairs of referenced elevation angles and referenced azimuth angles within the orientation-referenced image of the skyline.

15. The skyline imaging system of claim 14 wherein the processor also establishes a detected skyline from the orientation-referenced image of the skyline.

16. The skyline imaging system of claim 15 wherein the processor further establishes a solar access based on the detected skyline and the corresponding pairs of referenced elevation angles and referenced azimuth angles within the orientation-referenced image of the skyline.

17. The skyline imaging system of claim 12 wherein the inclination reference includes a one-dimensional gimbal having a single pivot axis within a housing.

18. The skyline imaging system of claim 12 wherein the inclination reference includes a two-dimensional gimbal having two pivot axes within a housing.

19. The skyline imaging system of claim 12 wherein the processor maps pixels within the orientation-referenced image of the skyline to corresponding pairs of referenced elevation angles and referenced azimuth angles within the orientation-referenced image of the skyline.

20. The skyline imaging system of claim 12 wherein the processor establishes a detected skyline from the orientation-referenced image of the skyline.

* * * * *